(12) United States Patent
Burroughs et al.

(10) Patent No.: US 9,467,966 B2
(45) Date of Patent: Oct. 11, 2016

(54) METHOD AND/OR SYSTEM FOR POSITIONING FROM A REFERENCE SIGNAL

(71) Applicant: QUALCOMM Incorporated, San Diego, CA (US)

(72) Inventors: Kirk Burroughs, Alamo, CA (US); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/682,012

(22) Filed: Apr. 8, 2015

(65) Prior Publication Data

US 2015/0296475 A1     Oct. 15, 2015

Related U.S. Application Data

(60) Provisional application No. 61/980,020, filed on Apr. 15, 2014.

(51) Int. Cl.
*H04W 64/00* (2009.01)
*H04W 56/00* (2009.01)

(52) U.S. Cl.
CPC ............. *H04W 64/00* (2013.01); *H04W 56/00* (2013.01)

(58) Field of Classification Search
CPC .............................. H04W 56/00; H04W 64/00
USPC ................ 455/452.1, 456.1, 456.6; 370/252; 342/357.31, 450, 457
See application file for complete search history.

(56) References Cited

U.S. PATENT DOCUMENTS

2004/0017312 A1\* 1/2004 Anderson ................. G01S 5/02
342/457

2013/0122930 A1\* 5/2013 Woo ....................... G01S 5/0205
455/456.1

(Continued)

FOREIGN PATENT DOCUMENTS

SE   WO 2012173540      * 12/2012    ............ H04W 64/00
WO   WO-2012173540 A1    12/2012

OTHER PUBLICATIONS

ZTE: "Positioning, PRS design in L.Te R9" 3RD GPP Draft; R1-091704 Positioning PRS Design in LTE R9, 3rd Generation Partnership Project (3GPP), Mobile Competence Centre ; 650, Route E Des LUCtOLES ; F-06921SOP,HiA-Antipol.Is Cedex ; France, no. San Francisco. USA; 2009u4_8.28 Apr. 2009 (Apr. 28, 2009),XP050339240,[retrieved on Apr. 28, 2009].\*

(Continued)

*Primary Examiner* — Inder Mehra
(74) *Attorney, Agent, or Firm* — Berkeley Law & Technology Group, LLP

(57) ABSTRACT

Techniques are provided that provide for or otherwise support positioning and related services for mobile devices via wireless signals. In an example, a mobile device in a communication network may acquire a first downlink signal from a first node in the communication network and a second downlink signal from a second node in the communication network. The first node may also be configured to transmit a data service signal and/or a voice service signal via the first downlink signal. However, the second node, by design, is not configured to transmit either a voice service signal or a data service signal via the second downlink signal. An estimated location of the mobile device may subsequently be determined, for example, based, at least in part, on the first and second terrestrial positioning signals.

29 Claims, 10 Drawing Sheets

(56) References Cited

U.S. PATENT DOCUMENTS

| | | | |
|---|---|---|---|
| 2014/0094188 A1 | 4/2014 | Kazmi et al. | |
| 2015/0223093 A1* | 8/2015 | Zhang | H04W 24/10 370/252 |
| 2015/0304867 A1* | 10/2015 | Aulin | H04B 7/024 370/252 |

OTHER PUBLICATIONS

Pantech & Curitel: PRS design for LTE Rel.-9 pos,tion,ng, 3GPP Draft; R1-092590_PRS Design FOFt LTE REL-9 Positioning, 3rd Generation Partnership Project (3GPP), Mobile Competence Center; 650, Route Des Lucioles ; F-06921 Sophia-ANTtPOLIS Cedex ; France, No. Los Angeles, USA; Jun. 26, 2009, Jun. 26, 2009 (Jun. 26, 2009), X P050351086,[retrieved on Jun. 2009.*

Fischer S., "Observed Time Difference of Arrival (OTDOA) Positioning in 3GPP LTE". Qualcomm Technologies, inc., Jun. 6, 2014, pp. 1-62.

"3rd Generation Partnership Project; Technical Specification Group Radio Access Network; Evolved Universal Terrestrial Radio Access (E-UTRA); LTE Positioning Protocol (LPP)", Release 12, 3GPP Standard; 3GPP TS 36.355, 3rd Generation Partnership Project (3GPP), Mobile Competence Centre; 650, Route Des Lucioles; F-06921 Sophia-Antipolis Cedex; France, vol. Ran WG2, No. V12.1.0, Mar. 17, 2014 (Mar. 17, 2014), pp. 1-126, XP050769946, [retrieved on Mar. 17, 2014] paragraph [6.5.12].

International Search Report and Written Opinion—PCT/US2015/025212—ISA/EPO—Aug. 7, 2015.

Pantech & Curitel: "PRS design for LTE Rel-9 positioning" 3GPP Draft; R1-092590_PRS Design for LTE Rel-9 Positioning, 3RD Generation Partnership.06921 Sophia-Antipolis Cedex ; France, no. Los Angeles, USA; Jun. 26, 2009, Jun. 26, 2009 (Jun. 26, 2009), XP050351086 [retrieved on Jun. 26, 2009].

Zte: "Positioning PRS design in LTE R9" 3GPP Draft; R1-091704 Positioning PRS Design in Lte R9, 3RD Generation Partnership Project (3GPP), Mobile.Cedex ; France, no. San Francisco, USA; Apr. 28, 2009, Apr. 28, 2009 (Apr. 28, 2009), XP050339240 [retrieved on Apr. 28, 2009].

Ericsson: "On LMU Nodes in LTE", 3GPP Draft; R3-121273, 3rd Generation Partnership Project vol. Ran WG3, no. Prague, Czech Republic; May 21, 2012-May 25, 2012, May 12 (May 12, 2012), XP050611281, [retrieved on May 12, 2012].

\* cited by examiner

METHOD AND/OR SYSTEM FOR POSITIONING FROM A REFERENCE SIGNAL

CROSS-REFERENCE TO RELATED APPLICATIONS

This application claims the benefit of U.S. Provisional Application No. 61/980,020, entitled "METHOD AND/OR SYSTEM FOR POSITIONING FROM A REFERENCE SIGNAL," filed Apr. 15, 2014, which is assigned to the assignee hereof and which is expressly incorporated herein by reference.

BACKGROUND

1. Field

Subject matter disclosed herein relates to location estimation at a mobile device.

2. Information

The location of a mobile device, such as a cellular telephone, may be estimated based on information gathered from various systems. In a cellular network implemented according to 4.0 G Long-Term Evolution (LTE), for example, a base station may transmit a positioning reference signal (PRS). A mobile device acquiring a PRSs transmitted by different base stations may deliver signal-based measurements to a location server for use in computing an estimate of a location of the mobile device using observed time difference of arrival (OTDOA) techniques. Alternatively, a mobile device may also compute an estimate of its location using OTDOA techniques.

SUMMARY

Briefly, a particular implementation is directed to a method comprising, at a mobile device in a communication network: acquiring a first downlink signal from a first node in the communication network, wherein the first node is configured to transmit a first terrestrial positioning signal, in addition to a data service signal or a voice service signal, or some combination thereof via the first downlink signal; acquiring a second downlink signal from a second node in the communication network, wherein the second node is configured to transmit a second terrestrial positioning signal via the second downlink signal, and wherein the second node is not configured to transmit either a voice service signal or a data service signal via the second downlink signal; and obtaining an estimated location of the mobile device determined based, at least in part, on locations of the first node and the second node, and the first terrestrial positioning signal and the second terrestrial positioning signal.

Another particular implementation is directed to a mobile device comprising: a wireless transceiver device; and one or more processors to: process a first downlink signal acquired at the wireless transceiver device and transmitted from a first node in a communication network configured to transmit a first terrestrial positioning signal in addition to a data service signal or a voice service signal, or some combination thereof via the first downlink signal; process a second downlink signal acquired at the wireless transceiver device from a second node in the communication network, wherein the second node is configured to transmit a second terrestrial positioning signal via the second downlink signal, and wherein the second node is not configured to transmit either a voice service signal or a data service signal via the second downlink signal; and obtain an estimated location of the mobile device determined based, at least in part, on locations of the first node and the second node, and the first terrestrial positioning signal and the second terrestrial positioning signal.

Another particular implementation is directed to a non-transitory storage medium comprising machine-readable instructions stored thereon which are executable by one or more processors of a mobile device to: process a first downlink signal acquired from a first node in a communication network, wherein the first node is configured to transmit a first terrestrial positioning signal in addition to a data service signal or a voice service signal, or some combination thereof via the first downlink signal; process a second downlink signal acquired from a second node in the communication network, wherein the second node is configured to transmit a second terrestrial positioning signal via the second downlink signal, and wherein the second node is not configured to transmit either a voice service signal or a data service signal via the second downlink signal; and obtain an estimated location of the mobile device determined based, at least in part, on locations of the first node and the second node, and the first terrestrial positioning signal and the second terrestrial positioning signal.

Another particular implementation is directed to a mobile device comprising: means for acquiring a first downlink signal from a first node in a communication network, wherein the first node is configured to transmit a first terrestrial positioning signal in addition to a data service signal or a voice service signal, or some combination thereof via the first downlink signal; means for acquiring a second downlink signal from a second node in the communication network, wherein the second node is configured to transmit a second terrestrial positioning signal via the second downlink signal, and wherein the second node is not configured to transmit either a voice service signal or a data service signal via the second downlink signal; and means for obtaining an estimated location of the mobile device determined based, at least in part, on locations of the first node and the second node, and the first terrestrial positioning signal and the second terrestrial positioning signal.

Another particular implementation is directed to a method at a node in a communication network comprising: wirelessly transmitting signals in a downlink, the downlink being dedicated for transmission of a positioning reference signal (PRS); controlling transmission of the PRS to mobile devices to have a duty cycle, wherein the downlink is dedicated for transmission of the PRS to the exclusion of voice or data service.

Another particular implementation is directed to a node in a communication network comprising: a transmitter for wirelessly transmitting signals in a downlink, the transmitter being dedicated for transmission of a positioning reference signal (PRS); and a controller to control transmission of the PRS to mobile devices, the controller being configured to control the PRS signal to have a duty cycle, wherein the node is dedicated for transmission of the PRS in the downlink to the exclusion of voice or data service.

Another particular implementation is directed to a non-transitory storage medium comprising machine-readable instructions stored thereon which are executable by a special purpose computing apparatus at a node in a communication network to: initiate wireless transmission of signals in a downlink, the downlink being dedicated for transmission of a positioning reference signal (PRS); control transmission of the PRS to mobile devices to have a duty cycle, wherein the downlink is dedicated for transmission of the PRS to the exclusion of voice or data service.

Another particular implementation is directed to an apparatus at a node in a communication network comprising: means for wirelessly transmitting signals in a downlink, the downlink being dedicated for transmission of a positioning reference signal (PRS); and means for controlling transmission of the PRS to mobile devices to have a duty cycle, wherein the downlink is dedicated for transmission of the PRS to the exclusion of voice or data service.

Another particular implementation is directed to a node in a communication network comprising: a transmitter for wirelessly transmitting signals in a downlink, the downlink being configured to transmit positioning reference signal (PRS) in addition to signals for support of at least one other subscriber service; a controller to control transmission of the PRS to mobile devices, the controller being configurable to vary a duty cycle of the PRS in response to a demand for usage of the downlink for support of the at least one other subscriber service.

Another particular implementation is directed to a method comprising, at a node in a communication network: wirelessly transmitting signals in a downlink, the downlink being configured to transmit positioning reference signal (PRS) in addition to signals for support of at least one other subscriber service; and controlling transmission of the PRS to mobile devices by varying a duty cycle of the PRS in response to a demand for usage of the downlink for support of the at least one other subscriber service.

Another particular implementation is directed to an apparatus at a node in a communication network, comprising: means for wirelessly transmitting signals in a downlink, the downlink being configured to transmit positioning reference signal (PRS) in addition to signals for support of at least one other subscriber service; and means for controlling transmission of the PRS to mobile devices by varying a duty cycle of the PRS in response to a demand for usage of the downlink for support of the at least one other subscriber service.

Another particular implementation is directed to a non-transitory storage medium comprising machine-readable instructions stored thereon which are executable by a processor at a communication node in a communication network to: initiate wireless transmission of signals in a downlink, the downlink being configured to transmit positioning reference signal (PRS) in addition to signals for support of at least one other subscriber service; and control transmission of the PRS to mobile devices by varying a duty cycle of the PRS in response to a demand for usage of the downlink for support of the at least one other subscriber service.

It should be understood that the aforementioned implementations are merely example implementations, and that claimed subject matter is not necessarily limited to any particular aspect of these example implementations.

BRIEF DESCRIPTION OF THE FIGURES

Non-limiting and non-exhaustive examples are described with reference to the following figures, wherein like reference numerals refer to like parts throughout the various figures.

DETAILED DESCRIPTION

Figure 1:
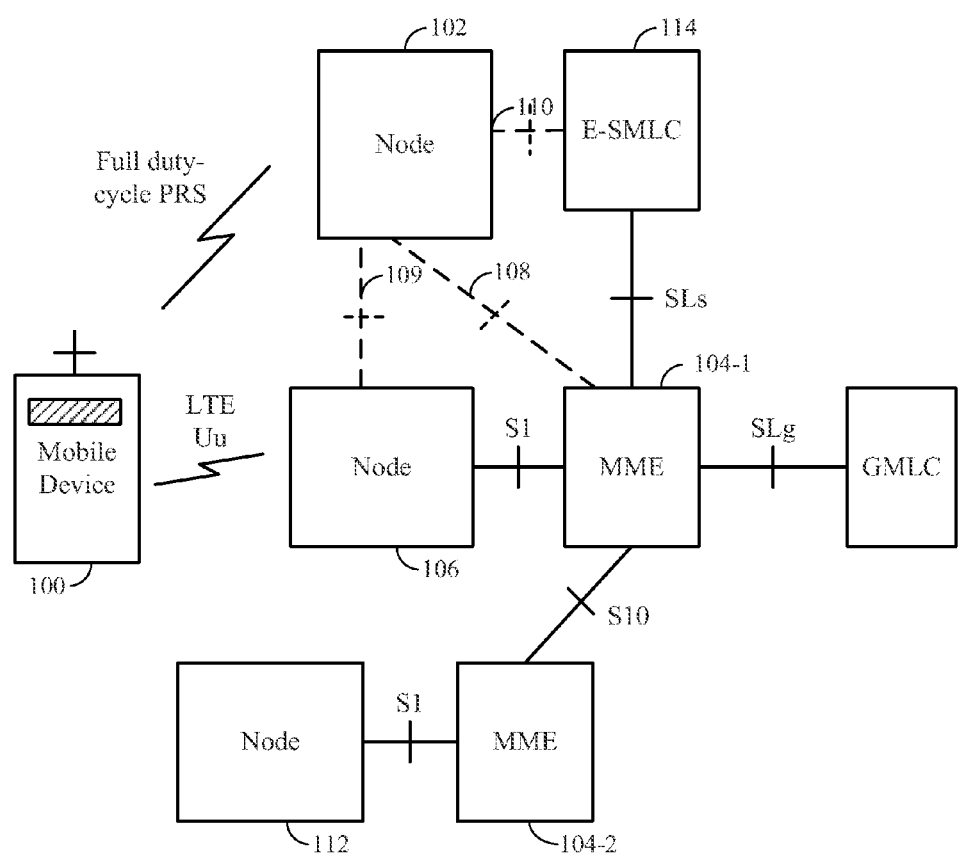
FIG. 1 is a system diagram illustrating certain features of a system comprising a mobile device, in accordance with an example implementation.

Techniques for positioning operations in outdoor environments have included use of global positioning system (GPS) and other like global navigation satellite systems (GNSSs). Here, a receiver may estimate its location at a point on the Earth based, at least in part, on acquisition of signals transmitted from multiple satellite-based transmitters in a GNSS constellation. In certain conditions or implementations, positioning operations based on acquisition of signals from GNSS transmitters may not be feasible such as in urban environments or mobile devices that do not have receivers capable of acquiring and processing signals transmitted from GNSS transmitters.

In certain scenarios, a cellular carrier may enable positioning operations at a mobile subscriber device based on acquisition of signals transmitted by a terrestrial transmitter (e.g., at a cellular base station). For example, a carrier may enable positioning operations based on acquisition of signals transmitted by a terrestrial transmitter using techniques such as advanced forward trilateration (AFLT) or observed time difference of arrival (OTDOA). Here, signals transmitted by terrestrial transmitters and acquired by a mobile subscriber for use in positioning operations may comprise terrestrial positioning signals. In this context, a "terrestrial positioning signal" comprises a signal transmitted with at least one detectable symbol or marker that may provide a timing reference at a receiver device. For example, transmission of a detectable marker or symbol in a terrestrial positioning signal may be synchronized according to a clock maintained at a transmitter. In another example, timing of a detectable marker or symbol in a terrestrial positioning signal may be modeled at a receiving device acquiring the terrestrial positioning signal.

In particular implementations, 4.0 Long-Term Evolution may specify the transmission of terrestrial positioning signals as positioning reference signals (PRSs) for use in OTDOA. Transmission of a PRS and use of a PRS for positioning operations are discussed throughout as specific examples of transmission of a terrestrial positioning signal and use of a terrestrial positioning signal for positioning operations for the purpose of illustration. It should be understood, however, that these are merely specific examples of transmission terrestrial positioning signals and use of same for positioning operations, and that claimed subject matter is not limited in this respect.

In a particular implementation, a PRS may occupy a dedicated portion of the user space of the spectrum of a downlink signal transmitted by a terrestrial transmitter for transmitting "beacons" enabling a mobile device such as a user equipment device (UE) to perform measurements to support positioning operations.

The current 3rd Generation Partnership Project (3GPP) standards only allow a limited set of configurations of PRS (e.g., duration and period of beacon signals). Particular example implementations disclosed herein are directed to allowing configurations of PRS to be extended up to and including allowing an entire transmit spectrum of a wireless transmitter to be allocated, thereby providing a "full duty cycle" beacon. In one particular implementation, a node in a communication network may be dedicated to providing a downlink signal solely for transmission of a full-duty cycle PRS (e.g., to the exclusion of a voice service signal or a data service signal).

LTE OTDOA may allow for inter-frequency OTODA. As such, a mobile device may be configurable to tune away to make OTDOA measurements on PRSs transmitted on multiple different frequency channels. Similar mechanisms may be used to measure any newly defined PRS configurations. Some systems may specify a mobile device to be tuned to an air interface/frequency channel, permitting a fully integrated solution where a PRS may be transmitted in band, out of band, or both to achieve a desired level of performance.

FIG. 1 is a schematic diagram showing a topology of an example cellular/wireless communications network according to an embodiment. The particular implementation shown in FIG. 1 is directed to an LTE network but features may similarly be implemented in other types of cellular/wireless networks without deviating from claimed subject matter. If in range of eNode B device at node 106 or node 112, a mobile device 100 may access full cellular/wireless service (e.g., voice, data, positioning, etc.) through uplinks/downlinks available at nodes 106 or 112. In a particular implementation, nodes 106 and 112 may comprise fully functional eNode B devices capable of providing voice or data services to subscriber devices (e.g., mobile device 100). As discussed below, node 102 may not comprise a fully functional eNode B device capable of providing voice and/or data services. In this context, a voice service and/or data service provided by a node to a mobile device (e.g., mobile device 100) enables the mobile device to have connectivity with other devices (e.g., other devices in a subscriber network) such that messages or data may be shared between the mobile device and one or more of the other devices via the node. In this illustration, mobile device 100 is shown as accessing service through node 106 (e.g., via an LTE Uu interface). As shown, nodes 106 and 112 are connected to corresponding mobility management entities (MMEs) 104 through S1 interfaces.

In the particular illustrated implementation, node 102 may transmit a downlink signal that is dedicated to providing a terrestrial positioning signal to the exclusion of other services such as a voice service or data service. In this context, node 102 may be transmitting a "full duty cycle" terrestrial positioning signal. In other implementations, with limited downlink signal capacity, node 106 and/or node 112 may selectively allocate a larger or smaller portion of its downlink signal to the transmission of a terrestrial positioning signal (e.g., versus transmission of voice service signal or data service signal). For example, in lower current voice or data service traffic conditions, node 106 and/or node 112 may increase an allocation of its downlink signal to the transmission of a terrestrial positioning signal (e.g., above 3.75 percent of the downlink signal) to a "high duty cycle" transmission.

In particular implementations, an S1 interface connecting an eNode B device and an MME may support, among other things, bi-directional data and voice transmission. For example, such an S1 interface may be implemented according to an S1 application protocol (S1AP) as set forth in 3GPP LTE standard (3GPP TS 36.413). Here, a fully functional S1 interface may implement or support various functions such as an E-RAB management, Initial Context Transfer, UE Capability Information Indication, Mobility, Paging, S1 Interface Management, NAS Signaling Transport, S1 UE Context Release, UE Context Modification, Status Transfer, Trace, Location Reporting, LPPa Signaling Transport, S1 CDMA Tunneling, Warning Message Transmission, and RAN Information Management and Configuration Transfer functions.

In particular implementations, mobile device 100 may acquire a PRS signal transmitted by either nodes 106 or 112 for use in positioning operations (e.g., to compute an estimated location using OTDOA techniques). While deployment of nodes 106 and 112 may be sufficient to satisfy carrier requirements to provide certain services (e.g., voice and data) in a particular service coverage area, nodes 106 and 112, by themselves, may not satisfy carrier requirements for positioning operations. For example, while mobile device 100 may be capable of accessing voice or data service through node 106, mobile device 100 may not be capable of acquiring a PRS with sufficient accuracy from a sufficient number of geographically diverse transmitters for use in computing an accurate estimate of its location using OTDOA.

To assist or complement nodes 106 and 112 in enabling positioning operations, according to an embodiment, a node 102 may provide an additional, geographically diverse, node for transmission of a PRS. In a particular implementation, node 102 may be dedicated to transmission of a PRS on a downlink signal and as such be incapable of supporting additional service access (e.g., voice, data, etc.). For example, node 102 may not even include certain hardware and/or software resources for implementation of certain services such as voice or data. As such, node 102 may enable a carrier to enhance positioning capabilities within a particular region without an expensive deployment of a fully functional eNode B device.

Furthermore, since in some instances node 102 may not be configured to support any services other than transmission of a PRS (e.g., excluding support of voice and data services), interface 108 connecting node 102 with MME 104-1 need not be a fully functional S1 interface, for example, which may implement a full set of S1 functions identified above. Thus, for example, interface 108 may omit all or part of one or more functions or other like capabilities such as E-RAB management, Initial Context Transfer, UE Capability Information Indication, Mobility, Paging, NAS Signaling Transport, S1UE Context Release, UE Context Modification, Status Transfer, Trace, Location Reporting, S1 CDMA Tunneling, Warning Message Transmission, or RAN Information Management and Configuration Transfer functions. For example, of the aforementioned functions in the set of S1 functions identified above, implementation of S1 Interface Management and LTE Positioning Protocol A (LPPa) Signaling Transport functions in interface 108 may be sufficient to enable node 102 to provide enhanced positioning capabilities using a downlink that is dedicated to transmission of a PRS to mobile devices (e.g., subscriber devices).

In particular implementations, an eNode B device (e.g., node 106 or 112) may exchange messages with a location server such as represented here by an enhanced serving mobile location center (E-SMLC) 114, possibly over an LPPa signaling transport (see, e.g., 3GPP TS 36.455) via an MME 104. Using an LPPa signaling transport in an uplink direction, for example, E-SMLC 114 may obtain from an eNode B device the information defining properties of a PRS to be transmitted to UEs as the OTDOA assistance data via another protocol such as LPP (LTE Positioning Protocol; see, e.g., 3GPP TS 36.355). As discussed below in detail, parameters defining a PRS to be transmitted may include, for example, bandwidth (BW), configuration index ($I_{PRS}$, which may then define offset ($\Delta_{PRS}$) and periodicity ($T_{PRS}$)), cyclic prefix length, number of antenna ports, SFN initialization time, burst or pulse duration ($N_{PRS}$), muting pattern, and muting sequence periodicity ($T_{REP}$). Using an LPPa signaling transport in an uplink direction, E-SMLC 114 may also obtain from an eNode B device the Enhanced Cell ID (ECID) measurements such as cell identity, Angle of Arrival (AoA), Timing Advance type 1 and type 2, Reference Signal Received Power (RSRP) and Reference Signal Received Quality (RSRQ), just to name a few examples.

In a particular implementation, an LPPa transport for transmitting messages between node 102 and E-SMLC 114 through MME 104-1 may be significantly reduced in scale. For example, functions of ECID measurement exchange may be left without being implemented, while transmission of parameters defining aspects of a terrestrial positioning signal (e.g., $I_{PRS}$, $\Delta_{PRS}$, $T_{PRS}$, $N_{PRS}$ or $T_{REP}$) may be sufficient to support positioning operations.

In another particular implementation, node 102 may retrieve the configuration parameters of terrestrial positioning signal from an Operations, Administration and Maintenance interface. In this particular implementation, interface 108 may be omitted. Alternatively, node 102 may be connected to node 106 and receive configuration parameters of terrestrial positioning signal via an interface 109. Also, interface 110 may enable E-SMLC 114 and node 102 to communicate directly and without an LPPa transport routed through MME 104-1.

In other implementations, by dedicating a downlink signal to the transmission of a PRS to the exclusion of other services, node 102 need not include signals for use by mobile device in acquiring other services such as voice and data. As such, implementation of node 102 may eliminate or omit transmission certain signals at the physical layer that aid in acquisition such as such as Cell-specific reference signal (CRS), Primary Synchronization Signal (PSS) and Secondary Synchronization Signal (SSS).

Figure 2A:
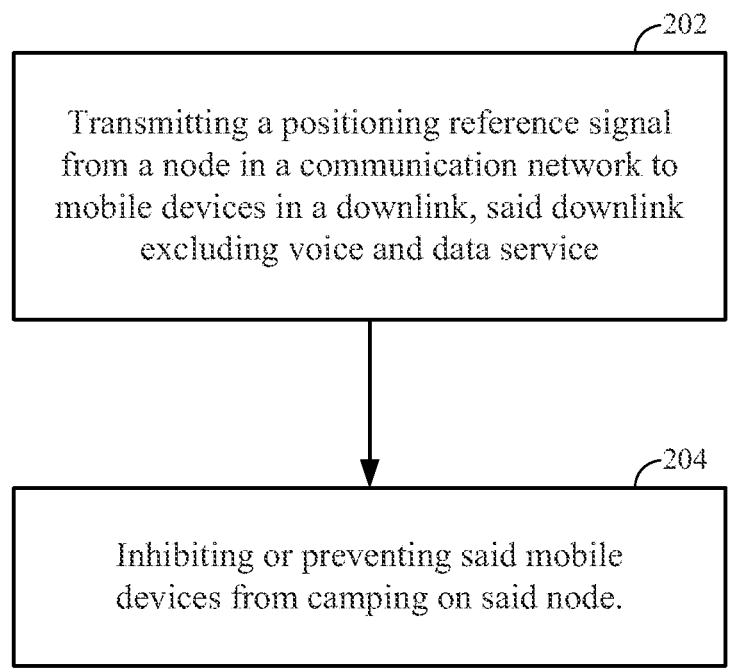
FIGS. 2A, 2B and 2C are flow diagrams of processes corresponding to certain techniques presented herein, in accordance with certain example implementations.

FIG. 2A is flow diagram of an example process according to a particular implementation. As pointed out above, to reduce cost, a node 102 may be configured without a capability to provide voice or data service to mobile device 100. Nevertheless, acquiring a pilot signal from node 102, mobile device 100 may attempt to "camp on" node 102 to receive services other than acquisition of a PRS (e.g., voice or data service). In an LTE implementation, for example, mobile device 100 may attempt camp on a node by performing an initial synchronization by acquiring PSS and SSS, and then performing a cell selection/reselection procedure based, at least in part, on a Reference Signal Received Power (RSRP). It should be understood, however, that this is merely an example of how a mobile device may attempt to camp on a node for a voice or data service in a particular LTE implementation, and that claimed subject matter is not limited in this respect. As pointed out above and in block 202, a node in a communication network (e.g., node 102) may transmit a PRS in a downlink signal to one or more subscriber devices where the downlink signal may be dedicated to transmission of the PRS, e.g., to the exclusion of voice and data service related transmissions. As discussed elsewhere, bandwidth in such a downlink signal may be dedicated to transmission of up to 100% duty cycle PRS. At block 204, the communication node may inhibit or prevent mobile devices (e.g., subscriber devices) from camping on device as it might another node (e.g., expecting to receive voice or data services). This may enable mobile devices in a network to efficiently acquire voice or data service at capable eNode B devices without consuming resources to camp on other devices that are not capable of providing such a voice or data service Particular implementations may inhibit or prevent a mobile device from camping on node 102. In one example, node 102 may use a restriction indicator such as the existing Closed Subscriber Group (CSG) indicator in System Information Block 1 (SIB1) to inform a recipient mobile device that the mobile device is not to camp on node 102, or that node 102 is unavailable for the recipient mobile device for camping on. Specifically the CSG may indicate to a recipient mobile device not to use the cell. SIB1 may be sent in a radio resource control (RRC) message over an LTE Uu interface (see 3GPP TS 36.331). In an alternative implementation, node 102 may inhibit or prevent a mobile device from camping on by not broadcasting a CRS in a downlink message. In the absence of a CRS in a downlink transmitted from node 102, a mobile device may not measure received signal strength and therefore not select node 102 for camping on. Removing a CRS from a downlink signal transmission may be enabled by making modifications to a transmitter at a physical layer. In yet another alternative implementation, node 102 may be configured to bar a cell for non-access stratum (NAS) to prevent a mobile device from measuring the barred cell. This may be implemented, for example, at an upper layer to last for 300 seconds per 3GPP TS 36.304. It should be understood that these are mere examples of how a node (such as node 102) in a communication network may inhibit or prevent subscriber devices from camping on for service, and that claimed subject matter is not limited in this respect.

In another particular implementation, an LTE network operator may prevent service to a mobile device from being handed over (e.g., from node 106 or 112) to node 102. In one embodiment, a mobile device may report signals that it measures to a serving eNode B device. The serving eNode B device may then determine that node 102 is not a candidate device for receiving a handoff for providing subsequent service to the mobile device. It should be understood that these are mere examples of how a mobile device may be inhibited or prevented from camping on a node (such as node 102) in a communication network for service, and that claimed subject matter is not limited in this respect.

In another particular implementation, an LTE network operator may identify particular cellular transceiver devices as having a downlink dedicated to transmission of a PRS (e.g., up to a full duty cycle). For example, E-SMLC 114 may provide OTDOA positioning assistance data to the mobile device 100 that identifies particular communication nodes (e.g., node 102) as having a downlink dedicated to transmission of a PRS. Mobile device 100 may then measure PRS from these particular cellular transceiver devices accordingly. OTDOA positioning assistance data may also include positioning assistance data for one or more high duty cycle cells (e.g., a cell having a node 106 or node 112). Mobile device 100 may apply such positioning assistance data to particular measured aspects of a PRS originating from these cells accordingly. For example, mobile device 100 may apply positioning assistance data (e.g., including locations of transmitting devices such as node 102) to compute an estimate of its location using an OTDOA technique. Accordingly, OTDOA positioning assistance data in the LPP spec TS36.355 may be modified to accommodate higher duty cycles such as higher $N_{PRS}$, lower $T_{PRS}$.

Figure 2B:
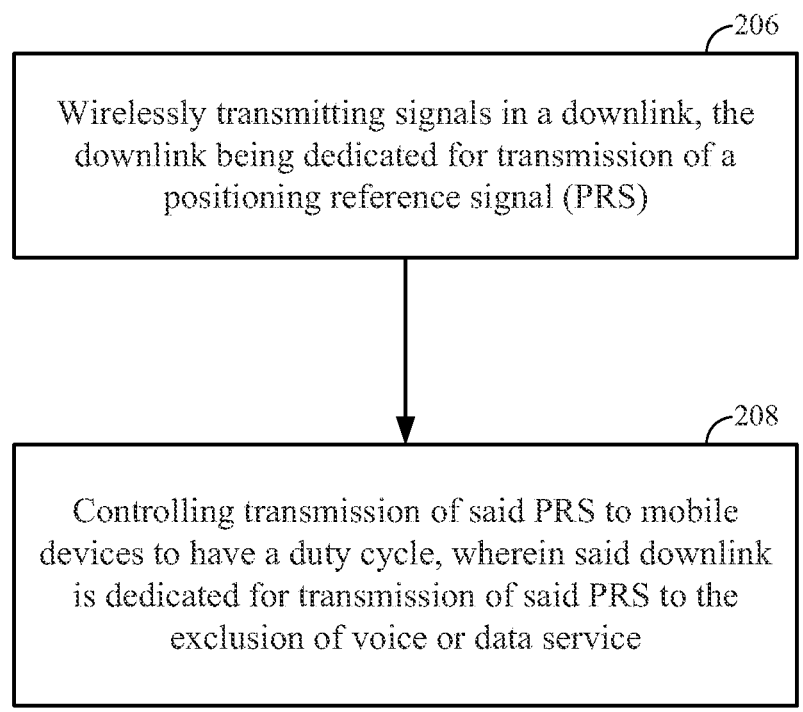

FIG. 2B is flow diagram of an example process according to a particular implementation. At block 206, a node in a communication network may wirelessly transmit signals in a downlink dedicated for transmission of a PRS. At block 208, the node may control transmission of the PRS to mobile devices (e.g., subscriber devices) to have a duty cycle (e.g., high or up to 100% duty cycle). Transmission of a higher duty cycle PRS on the downlink may be enabled by exclusion of voice service, data service or both using techniques described below.

Figure 2C:
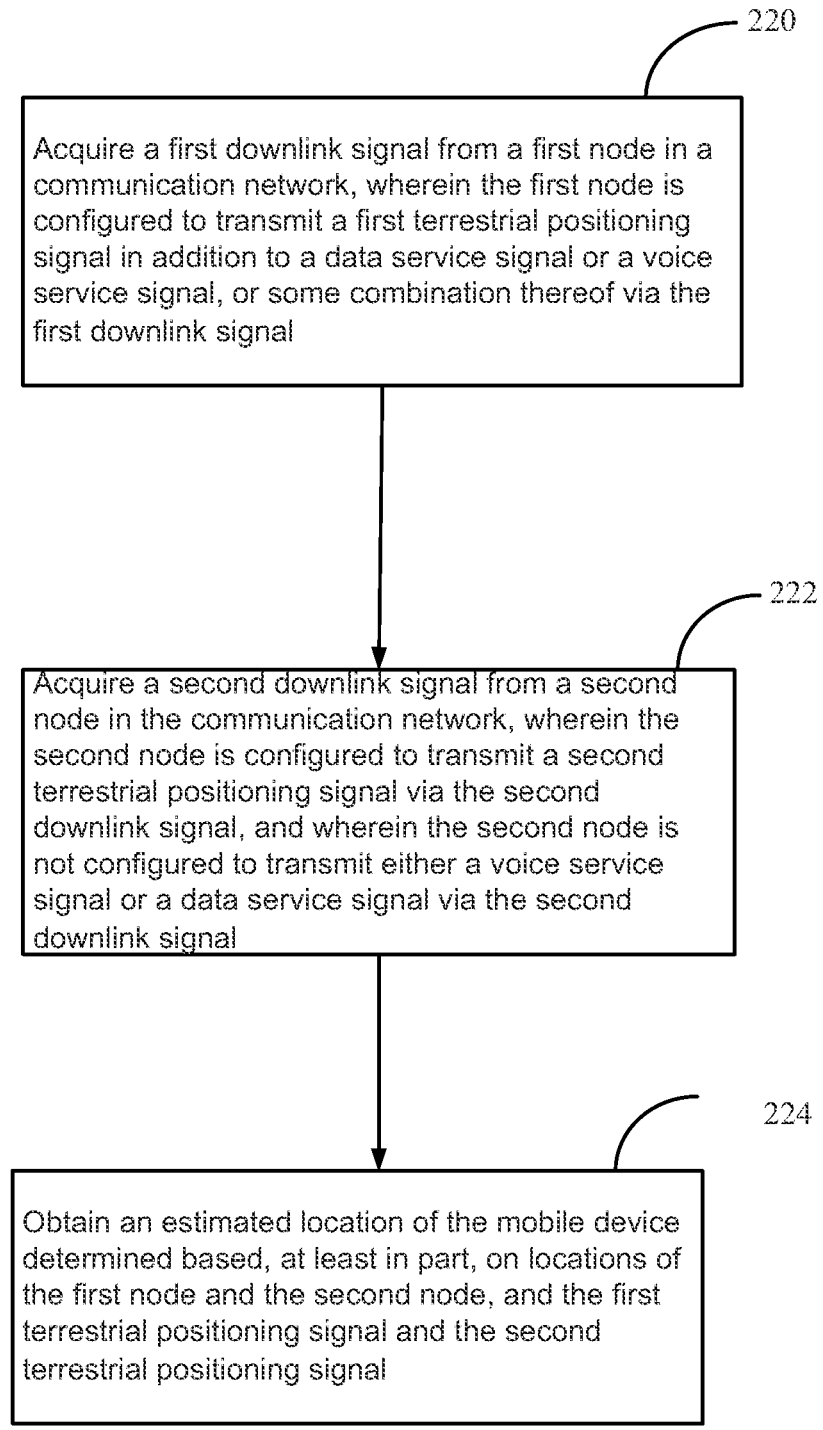

FIG. 2C is a flow diagram of an example process that may be executed by a mobile device (e.g., mobile device 100) according to a particular implementation. Here, a mobile device may be capable of providing or otherwise accessing voice services and/or data services based, at least in part, on one or more messages received in acquired downlink signals (e.g., downlink signals transmitted by node 106). Furthermore, the mobile device may be capable of facilitating positioning operations by acquisition of one or more terrestrial positioning signals (e.g., PRS) transmitted in downlink signals (e.g., downlink signals transmitted by node 102 or node 106).

At block 220, a mobile device may acquire a first downlink signal transmitted by a first node in a communication network. In addition to having a first terrestrial positioning signal, the first downlink signal may also transmit messages in support of a data or voice service such as a data service signal or a voice service signal. Accordingly, a first duty cycle of the first terrestrial positioning signal transmitted in the first downlink signal may have a limited duty cycle so as to not significantly impact a voice or data service also supported by the first downlink signal.

At block, 222, the mobile device may acquire a second downlink signal transmitted by a second node in the communication network. The second downlink signal may have a second terrestrial positioning signal but not transmit a voice service signal or a data service signal supporting a data or voice service. As such, the second terrestrial positioning signal may be transmitted in the second downlink at a second duty cycle (e.g., up to 100%) duty cycle as discussed above, which is higher than the first duty cycle. At block 224, the mobile device may obtain an estimate of its location determined based, at least in part, on observations of the first and second terrestrial positioning signals and locations of the first and second nodes. For example, an estimate of a location of the mobile device may be determined based, at least in part, on the aforementioned ODTOA techniques. In one particular implementation, block 224 may involve computation of the estimated location of the mobile device at the mobile device. Alternatively, block 224 may transmit observations of the first and second terrestrial positioning signals in one or more messages to a location server to compute an estimated location based, at least in part, on observations in the one or more messages and locations of the first and second nodes. The computed estimated location of the mobile device may then be transmitted back to the mobile device in one or more messages. As such, block 224 may then receive the computed estimate in the one or more messages transmitted back to the mobile device.

As pointed out above in particular examples, a downlink signal as acquired at block 222 may be transmitted from a node in a manner so as to inhibit a mobile device from camping on the node for a voice or data service. In particular, a mobile device may further process an acquired downlink signal (e.g., including acquisition of a PRS transmitted in the downlink signal) but then not further camp on the downlink signal to receive a voice or data service. For example, following acquisition of the downlink signal from a particular node, the mobile device may be inhibited from camping on the particular node for voice or data service in response to detection of a restrictor indicator in a message transmitted in the second downlink signal. Here, the restrictor indicator may inform recipient mobile devices not to camp on the particular node. In another example, following acquisition of the downlink signal from a particular node, the mobile device may be inhibited from camping on the particular node for voice or data service in response to detection of a Closed Subscriber Group indicator in a message transmitted in the downlink signal. In another example, following acquisition of the downlink signal from a particular node, the mobile device may be inhibited from camping on the particular node for voice or data service in response to detection of an absence of a Cell-specific reference signal, a primary synchronization signal or secondary synchronization signal, or any combination thereof in the downlink signal.

In another particular implementation, a mobile device may locally store indications (e.g., from positioning assistance data, base station almanac parameters, etc.) that the mobile device is not to camp on particular identified nodes for a voice or data service. As pointed out above, a mobile device may attempt to acquire a PRS transmitted in a downlink transmitted by a node, but not attempt to camp on the node for a voice or data service if locally stored indications specify that the mobile device is not to camp on.

Figure 5:
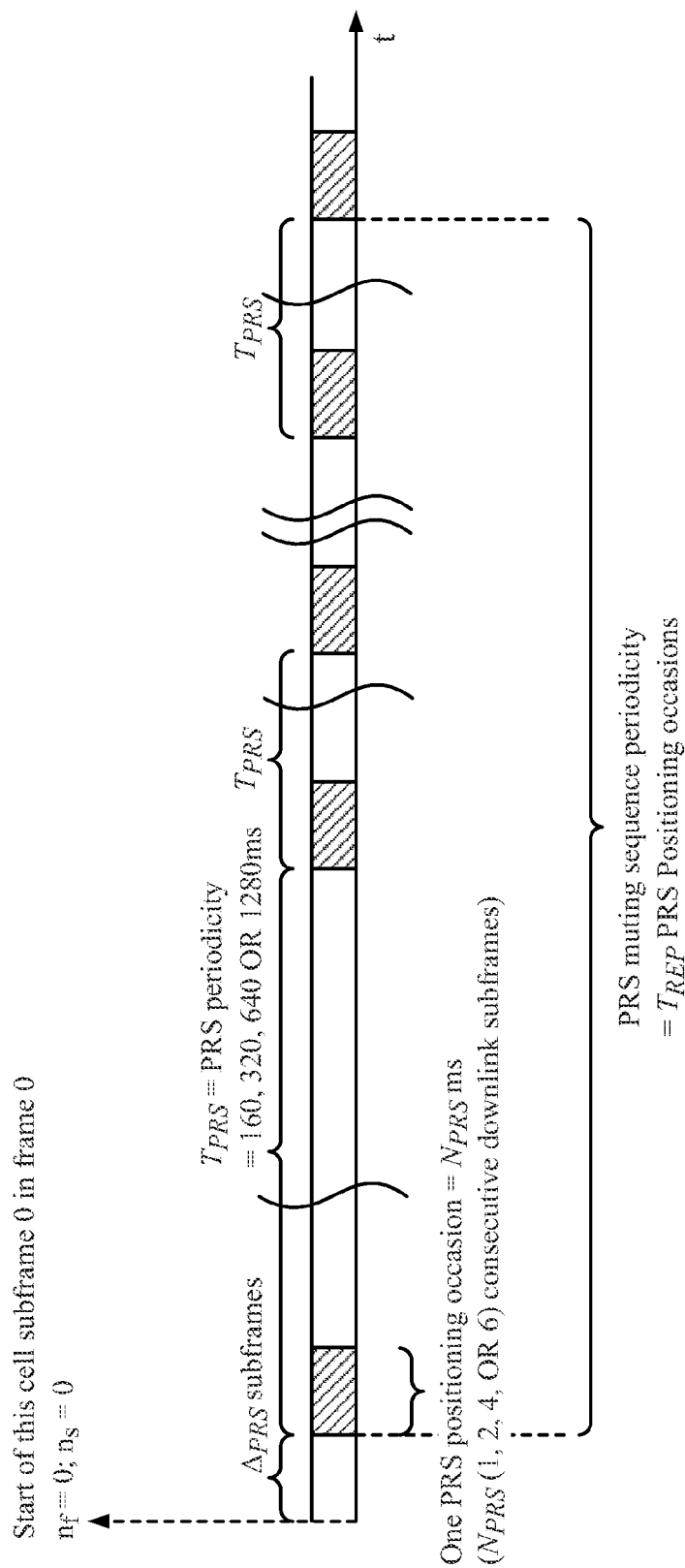
FIG. 5 is a timeline of a signal, in accordance with an example implementation.

In particular implementations, transmission of PRS may comprise transmission of a detectable pilot signal to aid positioning operations, even if the pilot signal is transmitted at a lower power. This may be achieved by reserving a block of bandwidth (BW) in certain time intervals for PRS transmission only (e.g., to the exclusion of voice and data communication service). As illustrated in FIG. 5, particular transmission of a PRS may be defined by BW, configuration index ($I_{PRS}$, which then defines offset ($\Delta_{PRS}$) and periodicity ($T_{PRS}$)), burst or pulse duration ($N_{PRS}$), muting pattern, and muting sequence periodicity ($T_{REP}$). As discussed below, in a particular implementation, node 102 may comprise a controller or processor to tailor transmission of a PRS at a high or full duty cycle by affecting parameters $T_{PRS}$ and/or $N_{PRS}$.

Figure 3:
FIGS. 3 and 4 are tables illustrating examples of positioning reference signal (PRS) overhead, in accordance with certain example implementations.
Figure 4:

FIGS. 3 and 4 summarize examples of PRS overhead for different values of BW and $N_{PRS}$, according to particular implementations. The tables of FIGS. 3 and 4 may be indicative of an overhead for transmission of PRS in combination with other services such as voice or data services, for example. FIG. 3 summarizes a particular example LTE implementation selecting BW to be 10.0 MHz while FIG. 4 summarizes a particular example LTE implementation selecting BW to be 20.0 MHz. Both tables assume a periodicity $T_{PRS}$ of 160 ms. As can be seen, a PRS overhead in a downlink increases from 0.6250% to 3.57% as $N_{PRS}$ is increased from 1.0 to 6.0 ms, for example.

In a particular implementation, selection of PRS BW and $N_{PRS}$ may comprise a tradeoff between positioning performance and overhead. For example, one recommendation may call for selection of $N_{PRS}$=1.0 ms with PRS signal bandwidth approaching available LTE system bandwidth, which may render a compromise between PRS accuracy and LTE capacity overhead. Selection of $N_{PRS}$=6.0 ms may produce better OTDOA performance than other values selected for $N_{PRS}$. As discussed below, more aggressive approaches at a dedicated device such as node 102 may further increase performance gains.

Particular implementations of PRS in a full-service eNode B base station may be transmitted at a duty cycle of 3.75% by setting $N_{PRS}$=6.0 ms and $T_{PRS}$=160.0 ms on a shared frequency channel. Inter-frequency OTDOA assistance data may be used to provide PRS parameters (e.g., time search window or $I_{PRS}$ to enable unscrambling) info in a specific frequency band. A location server may combine measurements from a range of PRS configurations.

In other implementations, as discussed above, affecting parameters $N_{PRS}$ and/or $T_{PRS}$ on a dedicated frequency channel (e.g., a dedicated single frequency channel) may achieve a higher or full duty cycle transmission of PRS (e.g., duty cycle of greater than a threshold value of 3.75% and possibly up to 100%). For example, an enhanced PRS transmitted with a larger $N_{PRS}$ (e.g., $N_{PRS}$>6.0 ms) and/or shorter $T_{PRS}$ (e.g., $T_{PRS}$<160.0 ms) may achieve up to a full duty cycle (e.g., setting $N_{PRS}$=$T_{PRS}$). Enhanced inter-frequency positioning assistance data to a UE for OTDOA may provide enhanced PRS parameters regarding a specific frequency band where a higher or full-duty cycle PRS is to be transmitted and acquired. Returning to the particular implementation of FIG. 1, node 102 may inexpensively provide an additional PRS source to enhance positioning operations without deployment of an additional fully enabled eNode B device. Being dedicated to provide a PRS in a downlink channel (again, without providing additional access services such as voice or data), node 102 may be controlled by transmit a high or full-duty cycle PRS in a dedicated downlink.

In alternative implementations, node 106 or 112 may be configurable to affect a duty cycle of a transmitted PRS by, for example, varying parameters $N_{PRS}$ and/or $T_{PRS}$ using techniques as discussed above. For example, node 106 or 112 may be configured (e.g., through or by E-SMLC 114) to vary a duty cycle of a PRS to be transmitted up to a full duty cycle in a downlink. In a particular implementation in which a downlink comprises a PRS transmission in addition to other interleaved transmissions for services such as voice or data, a duty cycle of a PRS transmission in the downlink may be dynamically varied depending on, for example, demand for the downlink by other services such as voice or data services.

Figure 6:
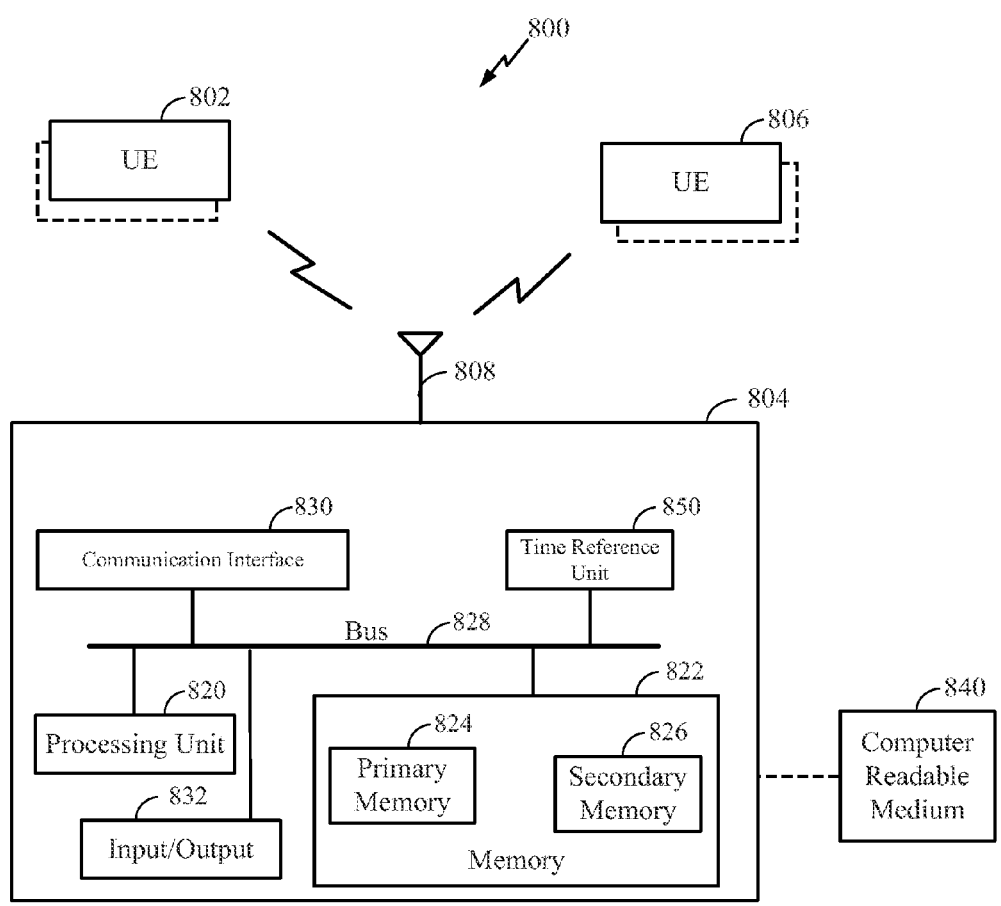
FIG. 6 is a schematic block diagram depicting an example wireless communication system including a plurality of computing platforms comprising one or more wirelessly connected devices, in accordance with an implementation.

FIG. 6 is a schematic diagram illustrating an example system 800 that may include one or more devices configurable to implement techniques or processes described above, for example, in connection with FIG. 1. System 800 may include, for example, a first device 802, a second device 804, and a third device 806, which may be operatively coupled together through a wireless communications network. In an aspect, first device 802 may comprise a UE as shown, for example. Second device 804 may comprise a node in a cellular/wireless communication network and third device 806 may comprise another UE, in an aspect. Also, in an aspect, devices 802, 804 and 806 may be included in a wireless communications network which may comprise one or more wireless access points, for example. However, claimed subject matter is not limited in scope in these respects. In certain particular implementations, device 804 may have features or aspects of node 102, or eNode B nodes 106 and 112.

Figure 8:
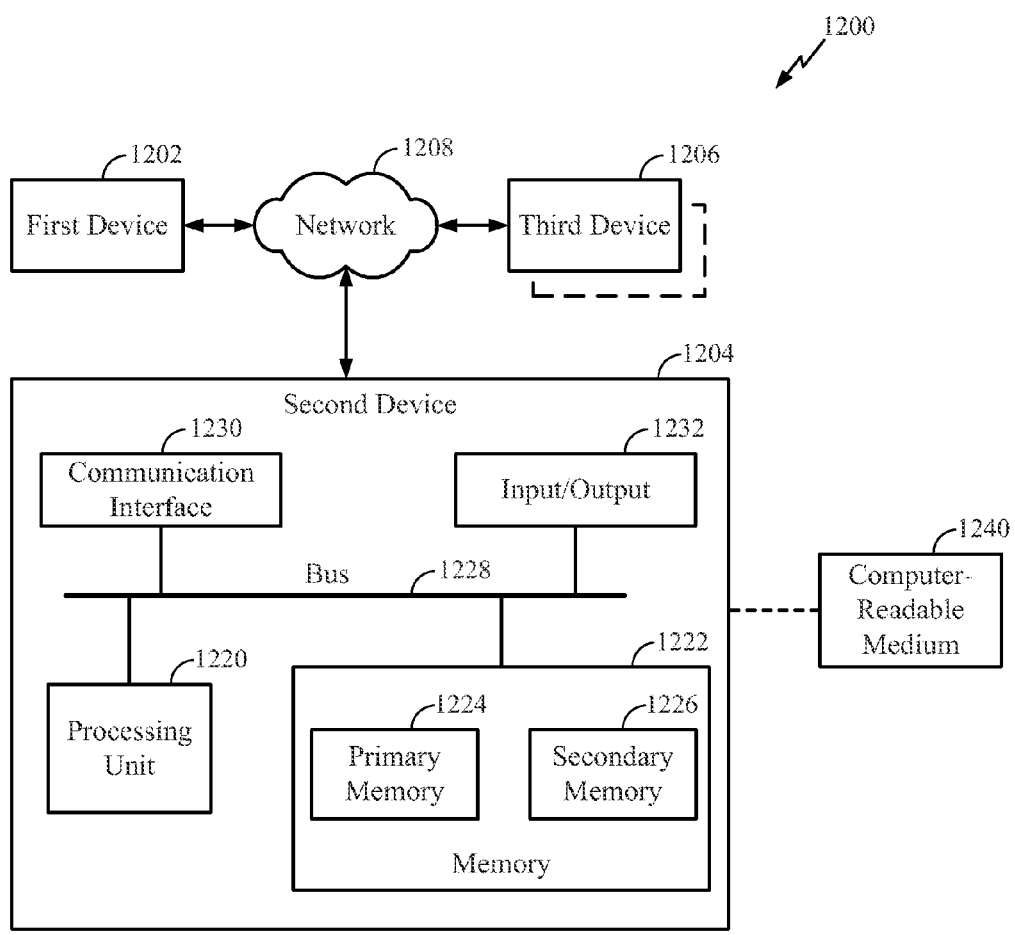
FIG. 8 is a schematic block diagram of an example computing platform in accordance with an implementation.

First device 802, second device 804 and third device 806, as shown in FIG. 8, may be representative of any device, appliance or machine that may be configurable to exchange data over a wireless communications network. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; wireless telecommunications access terminal; or any combination thereof. Any of the first, second, and third devices 802, 804, and 806, respectively, may comprise one or more of an access point or a mobile device in accordance with the examples described herein.

Similarly, a wireless communications network, as shown in FIG. 6, is representative of one or more communication links, processes, or resources configurable to support the exchange of data between at least two of first device 802, second device 804, and third device 806. By way of example but not limitation, a wireless communications network may include wireless or wired communication links, telephone or telecommunications systems (e.g., LTE), data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to system 800.

It is recognized that all or part of the various devices and networks shown in FIG. 6, and the processes and methods as further described herein, may be implemented using or otherwise including hardware, firmware, software, or any combination thereof.

Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 830 that provides for or otherwise supports the operative coupling of second device 804 to a wireless communications network at least through an antenna 808. By way of example but not limitation, communication interface 830 may include a network interface device or card, a modem, a router, a switch, a transceiver, and the like. In a particular implementation, communication interface 830 may comprise a wireless transmitter that is configured for transmission of a PRS. For example, a wireless transmitter of communication interface 830 may be dedicated for transmission of a PRS on a dedicated downlink to the exclusion of other services. In another particular implementation, for example, processing unit 820 in combination with memory 822 may provide a controller capable of controlling a duty cycle of a PRS transmitted through a transmitter of communication interface by, for example, controlling parameters such as PRS BW, $T_{PRS}$ and/or $N_{PRS}$ as discussed above. As such, processing unit 820 in combination with memory 822 may perform all or a portion of the actions at block 208. Similarly, processing unit 820 in combination with memory 822 may perform all or portions of actions performed at block 204.

In particular implementations, communications interface 830 in combination with antenna 808 may perform all or portions of actions performed at blocks 202 and 206 discussed above.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

Figure 7:
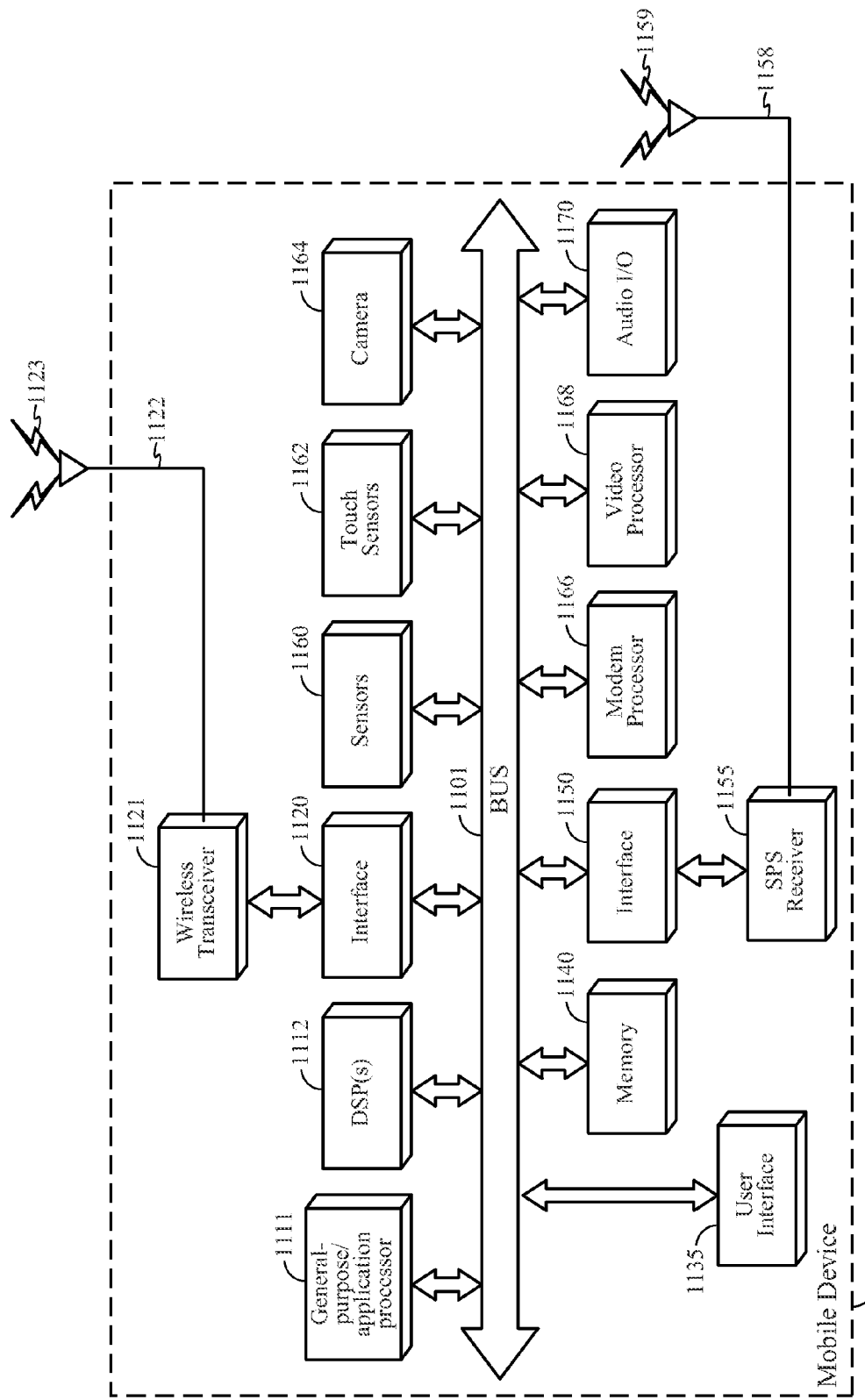
FIG. 7 is a schematic block diagram of a mobile device, in accordance with an example implementation.

FIG. 7 is a schematic diagram of a mobile device according to an embodiment. Mobile device 100 (FIG. 1) may comprise one or more features of mobile device 1100 shown in FIG. 7. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth, just to name a few examples. In a particular implementation, wireless transceiver 1121 may receive and acquire a downlink signal comprising a terrestrial positioning signal such as a PRS. For example, wireless transceiver device may process an acquired terrestrial positioning signal sufficiently to enable detection of timing of the acquired terrestrial positioning signal.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1100. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals (e.g., signals acquired from wireless transceiver 1121) for use in performing positioning operations may be performed in memory 1140 or registers (not shown). As such, general-purpose processor(s) 1111, memory 1140, DSP(s) 1112 and/or specialized processors may provide a location engine for use in processing measurements to estimate a location of mobile device 1100. In a particular implementation, all or portions of actions or operations set forth at blocks 220 and 222 may be executed by general-purpose processor(s) 1111 or DSP(s) 1112 based on machine-readable instructions stored in memory 1140. For example general-purpose processor(s) 1111 or DSP(s) 1112 may process a downlink signal acquired by wireless transceiver 1121 to, for example, perform one or more positioning operations (e.g., using OTDOA techniques based on acquisition of one or more PRS').

Also shown in FIG. 7, digital signal processor(s) (DSP(s)) 1112 and general-purpose processor(s) may be connected to memory 1140 through bus 1101. A particular bus interface (not shown) may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 7, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 8 is a schematic diagram illustrating an example system 1200 that may include one or more devices configurable to implement techniques or processes described above. System 1200 may include, for example, a first device 1202, a second device 1204, and a third device 1206, which may be operatively coupled together through a wireless communications network 1208. In an aspect, first device 1202 may comprise a server (e.g., E-SMLC 114) capable of providing positioning assistance data such as, for example, OTDOA positioning assistance data including indications of which frequency channels are carrying PRSs, the center and size of search window for the OTDOA signals, locations of beacon transmitters, timing relationship among beacon transmitters, just to provide a few examples. Also, in an aspect, wireless communications network 1208 may comprise one or more wireless access points, for example. However, claimed subject matter is not limited in scope in these respects.

First device 1202, second device 1204 and third device 1206 may be representative of any device, appliance or machine (e.g., such as MMEs 104, mobile device 100, E-SMLC 114 or node 102, 106 or 112). For example, E-SMLC 114 may transmit messages to node 102, 106 or 112 to configure node 102, 106 or 102. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208, may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

As used herein, the term "mobile device" refers to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project"

(3GPP). Cdma2000 is described in documents from a consortium named "3rd Generation Partnership Project 2" (3GPP2). 3GPP and 3GPP2 documents are publicly available. 4G Long Term Evolution (LTE) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device in a communication network:
    acquiring a first downlink signal from a first node in the communication network, wherein the first node is configured to transmit a first terrestrial positioning signal, in addition to a data service signal or a voice service signal, or some combination thereof via the first downlink signal;
    acquiring a second downlink signal from a second node in the communication network, wherein the second node is configured to transmit a second terrestrial positioning signal via the second downlink signal, and wherein the second node is incapable of transmitting either a voice service signal or a data service signal via the second downlink signal; and
    obtaining an estimated location of the mobile device determined based, at least in part, on locations of the first node and the second node, and the first terrestrial positioning signal and the second terrestrial positioning signal.

2. The method of claim 1, and further comprising inhibiting the mobile device from camping on the second node for a voice service or a data service.

3. The method of claim 2, and further comprising:
    receiving a message comprising an indication that the second node is unavailable for camping on by the mobile device; and
    wherein inhibiting the mobile device from camping on the second node for the voice service or the data service further comprises inhibiting the mobile device from initiating camping on the second node in response to the indication.

4. The method of claim 2, and further comprising:
    receiving a message comprising a Closed Subscriber Group indicator; and
    wherein inhibiting the mobile device from camping on the second node further comprises inhibiting the mobile device from initiating camping on the second node in response to the Closed Subscriber Group indicator.

5. The method of claim 2, wherein inhibiting the mobile device from camping on the second node further comprises inhibiting the mobile device from initiating camping on the second node in response to an absence of a Cell-specific reference signal, a primary synchronization signal or secondary synchronization signal, or any combination having been received from the second node.

6. The method of claim 1, wherein the first terrestrial positioning signal is transmitted with a first duty cycle in the first downlink signal of less than or equal to a threshold value, and wherein the second terrestrial positioning signal is transmitted with a second duty cycle in the second downlink signal greater than the threshold value.

7. The method of claim 6, wherein the threshold value is 3.75 percent.

8. The method of claim 1, wherein the second terrestrial positioning signal is transmitted in the second downlink signal on a single frequency channel.

9. A mobile device comprising:
    a wireless transceiver device; and
    one or more processors to:
        process a first downlink signal acquired at the wireless transceiver device and transmitted from a first node in a communication network configured to transmit a first terrestrial positioning signal in addition to a data service signal or a voice service signal, or some combination thereof via the first downlink signal;
        process a second downlink signal acquired at the wireless transceiver device from a second node in the communication network, wherein the second node is configured to transmit a second terrestrial positioning signal via the second downlink signal, and wherein the second node is incapable of transmitting either a voice service signal or a data service signal via the second downlink signal; and
        obtain an estimated location of the mobile device determined based, at least in part, on locations of the first node and the second node, and the first terrestrial positioning signal and the second terrestrial positioning signal.

10. The mobile device of claim 9, wherein the one or more processors are further to inhibit the mobile device from camping on the second node for a voice service or a data service.

11. The mobile device of claim 10, wherein the one or more processors are to inhibit the mobile device from camping on the second node for voice or data service in response to detection of a restrictor indicator in a message received by the wireless transceiver device.

12. The mobile device of claim 10, and wherein the one or more processors are to inhibit the mobile device from camping on the second node for voice or data service in response to a Closed Subscriber Group indicator in a message received at the wireless transceiver device.

13. The mobile device of claim 10, and wherein the one or more processors are further to inhibit the mobile device from camping on the second node for voice or data service in response to an absence of a Cell-specific reference signal, a primary synchronization signal or secondary synchronization signal, or any combination thereof having been received from the second node.

14. The mobile device of claim 9, wherein the first terrestrial positioning signal is transmitted with a first duty cycle in the first downlink signal of less than or equal to a threshold value, and wherein the second terrestrial positioning signal is transmitted with a second duty cycle in the second downlink signal greater than the threshold value.

15. The mobile device of claim 14, wherein the threshold value is 3.75 percent.

16. The mobile device of claim 9, wherein the second terrestrial positioning signal is transmitted in the second downlink signal on a single frequency channel.

17. A non-transitory storage medium comprising machine-readable instructions stored thereon which are executable by one or more processors of a mobile device to:
  process a first downlink signal acquired from a first node in a communication network, wherein the first node is configured to transmit a first terrestrial positioning signal in addition to a data service signal or a voice service signal, or some combination thereof via the first downlink signal;
  process a second downlink signal acquired from a second node in the communication network, wherein the second node is configured to transmit a second terrestrial positioning signal via the second downlink signal, and wherein the second node is incapable of transmitting either a voice service signal or a data service signal via the second downlink signal; and
  obtain an estimated location of the mobile device determined based, at least in part, on locations of the first node and the second node, and the first terrestrial positioning signal and the second terrestrial positioning signal.

18. The non-transitory storage medium of claim 17, wherein said machine-readable instructions are further executable by said one or more processors to:
  inhibit the mobile device from camping on the second node for a voice service or a data service.

19. The non-transitory storage medium of claim 18, wherein said machine-readable instructions are further executable by said one or more processors to:
  inhibit the mobile device from camping on the second node for the voice service or the data service in response to an indicator in a message received by the mobile device.

20. The non-transitory storage medium of claim 19, wherein said machine-readable instructions are further executable by said one or more processors to:
  inhibit the mobile device from camping on the second node for the voice service or the data service in response to an absence of a Cell-specific reference signal, a primary synchronization signal or secondary synchronization signal, or any combination having been received from the second node.

21. The non-transitory storage medium of claim 19, wherein the first terrestrial positioning signal is transmitted with a first duty cycle in the first downlink signal of at less than or equal to a threshold value, and wherein the second terrestrial positioning signal is transmitted with a second duty cycle in the second downlink signal greater than the threshold value.

22. The non-transitory storage medium of claim 21, wherein the threshold value is 3.75 percent.

23. The non-transitory storage medium of claim 18, wherein said machine-readable instructions are further executable by said one or more processors to:
  inhibit the mobile device from camping on the second node for the voice service or the data service in response to a Closed Subscriber Group indicator in a message received by the mobile device.

24. A mobile device comprising:
  means for acquiring a first downlink signal from a first node in a communication network, wherein the first node is configured to transmit a first terrestrial positioning signal in addition to a data service signal or a voice service signal, or some combination thereof via the first downlink signal;
  means for acquiring a second downlink signal from a second node in the communication network, wherein the second node is configured to transmit a second terrestrial positioning signal via the second downlink signal, and wherein the second node is incapable of transmitting either a voice service signal or a data service signal via the second downlink signal; and
  means for obtaining an estimated location of the mobile device determined based, at least in part, on locations of the first node and the second node, and the first terrestrial positioning signal and the second terrestrial positioning signal.

25. The mobile device of claim 24, and further comprising means for inhibiting the mobile device from camping on the second node for a voice service or a data service.

26. The mobile device of claim 25, wherein said means for inhibiting the mobile device from camping on the second node for voice or data service further comprises means for inhibiting the mobile device from camping on the second node for voice or data service in response to detection of an indication in a message received by the mobile device.

27. The mobile device of claim 25, wherein said means for inhibiting the mobile device from camping on the second node further comprises means for inhibiting the mobile device from camping on the second node for voice or data service in response to a Closed Subscriber Group indicator in a message received at the mobile device.

28. The mobile device of claim 25, wherein said means for inhibiting the mobile device from camping on the second node further comprises means for inhibiting the mobile device from camping on the second node for voice or data service in response to an absence of a Cell-specific reference signal, a primary synchronization signal or secondary synchronization signal, or any combination thereof having been received from the second node.

29. The mobile device of claim 24, wherein the second terrestrial positioning signal is transmitted in the second downlink signal on a single frequency channel.

\* \* \* \* \*